J. C. WILLMON.
VEHICLE WHEEL.
APPLICATION FILED APR. 22, 1919.
1,378,303.
Patented May 17, 1921.
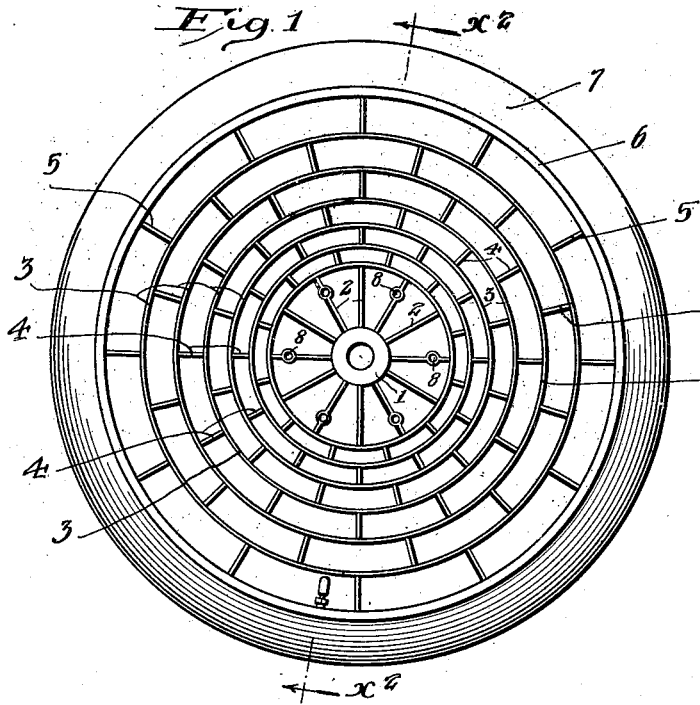
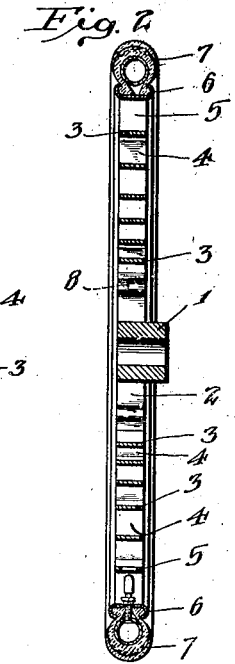
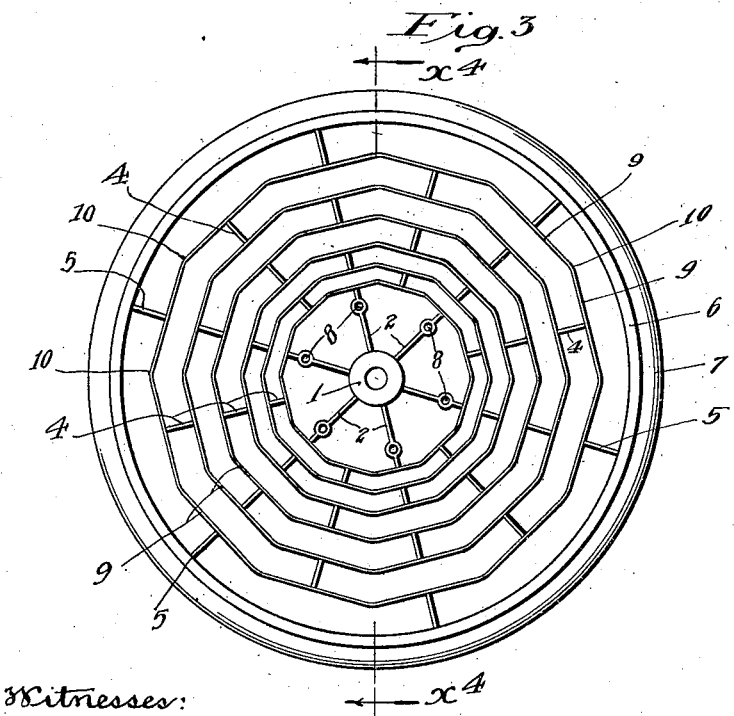
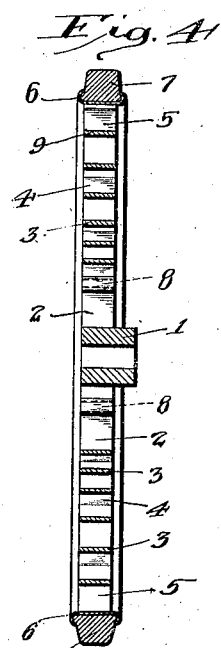
Inventor
Jeremy C. Willmon
By Frederick Whyon Atty.

UNITED STATES PATENT OFFICE.

JEREMY C. WILLMON, OF LOS ANGELES, CALIFORNIA.

VEHICLE-WHEEL.

1,378,303.

Specification of Letters Patent.  Patented May 17, 1921.

Application filed April 22, 1919. Serial No. 291,912.

*To all whom it may concern:*

Be it known that I, JEREMY C. WILLMON, a citizen of the United States, residing at Los Angeles, in the county of Los Angeles and State of California, have invented a new and useful Vehicle-Wheel, of which the following is a specification.

This invention relates to wheel structures of the type employed on the chassis of a vehicle and an object of the invention is to provide a vehicle wheel which is capable of absorbing relatively hard blows and shocks without injury to the wheel and other parts of the vehicle.

Another object is to produce a wheel having a reticulated structure between the hub and rim so as to brace the rim at intervals therearound and also allow the rim to yield to some extent relative to the hub when the tire engages an obstruction or bump in the roadway or when said tire runs into a depression in the roadway.

Another object is to make provision in a resilient wheel for a greater degree of stiffness of the wheel structure toward the center of the wheel and more and more resiliency as the rim is approached.

Other objects and advantages will appear in the subjoined detailed description.

The accompanying drawings illustrate the invention:

Figure 1 is a side elevation of a wheel built in accordance with the provisions of this invention, a tire also being shown in place on the wheel.

Fig. 2 is a sectional elevation on line indicated by $x^2-x^2$, Fig. 1.

Fig. 3 is a side elevation of another form of wheel made in accordance with this invention, a tire also being shown on the wheel rim.

Fig. 4 is a sectional elevation on line indicated by $x^4-x^4$, Fig. 3.

There is provided a hub 1 of any suitable construction and radiating from said hub are spokes 2 which are connected at their inner ends to the hub in any suitable manner or, may be made integral with said hub. Surrounding the spokes 2 are a series of concentric rings 3 which are connected to one another and spaced from one another by spokes 4, there being a series of spokes between each two adjacent rings and the innermost ring 3 being fastened to the outer ends of the spokes 2. Other spokes 5 connect the outermost ring 3 with a suitable rim 6 which may be provided with a tire 7 of any suitable material and construction. In Figs. 1 and 2 the tire shown is of the pneumatic type and in Figs. 3 and 4 the tire is of solid rubber. The tire 7 may be made detachable, or not, as desired, the detachable construction being so well understood in this art as to require no detailed description thereof. The spokes 2 may be provided with bolt holes 8 or other means for securing a brake drum, not shown, to the wheel. The concentric rings 3 and spokes 2, 4 and 5 constitute a reticulated structure connecting the hub 1 with the rim 6. The spokes are in the form of flat strips and the rings are in the form of bands.

The rings may be cylindrical as shown in Fig. 1, or may be of polygonal shape as in Fig. 3. The spokes 4 between any two adjacent rings are in staggered relation to the spokes 4 of the next adjacent series of spokes so that strain or pressure will be transmitted from any given spoke to the adjacent ring at a point midway between the point of attachment of the adjacent spokes connected to said ring. Thus there is more or less resiliency provided by the reticulated structure. This resiliency will be a maximum if the spokes 2, 4, 5 and rings 3 be constructed of sheet metal. If greater stiffness of the reticulated structure is desired, the spokes 2, 4, 5 and rings 3 may be of cast metal such, for instance, as steel and they may be cast integral with one another. If desired sheet and cast material may be used in combination, some of the rings being made of sheet metal and some of cast metal so as to obtain a degree of resiliency between that afforded by making the reticulated structure entirely of sheet metal and making it entirely of cast metal.

In the form of the invention shown in Fig. 3 the spokes 2, 4, 5 are attached to the rings 3 substantially midway of the sides 9 of the polygons formed by the rings, thus the spokes are attached to the rings at the points of greatest resiliency of said rings so that the shock transmitted by any given spoke will be received by the ring to which it is connected at one or more of the more resilient portions of said ring, it being understood that the junction points 10 of the adjacent sides 9 of the polygonal rings are stiffened because of the angular character of the ring.

In practice, the vehicle will be provided with the correct number of wheels made in accordance with the foregoing description and when the vehicle is running along the roadway and one of the wheels strikes an obstruction, shock transmitted by the tire to the rim will be transmitted by one or more of the spokes 5 to the outermost ring 3 which will yield to some degree and transmit the bending moment to the next inner ring 3 through one or more of the spokes 4. This next inner ring in turn will be compressed to some extent and transmit the pressure to the third ring through other of the spokes 4 and so on, each ring in turn from the outermost to the innermost being somewhat less yielding as the pressure is transmitted toward the axis of the wheel, because the rings 3 are of less diameter the nearer they are positioned to the axis of the wheel and because the spokes 4 of each concentric series are closer together the nearer the series are positioned to the axis of the wheel.

The rim of the wheel may be of any suitable form, for example, it may be formed with a flange so as to run on rails and in that event the wheel would take the place of the ordinary car wheel.

I claim:

A vehicle wheel comprising a hub, a rim, concentric polygonal rings positioned between the hub and rim with their sides and angled corners relatively radially alined, spokes connecting the hub to the innermost ring, spokes connecting the rim to the outermost ring, and spokes connecting the rings to one another, the spokes connecting with the middle portion of the polygon sides of the rings and arranged in staggered relation one to another.

Signed at Los Angeles, California, this 16th day of April 1919.

JEREMY C. WILLMON.

Witnesses:
 GEORGE H. HILES,
 L. BELLE WEAVER.